United States Patent [19]

Medlin

[11] Patent Number: 4,533,060
[45] Date of Patent: Aug. 6, 1985

[54] MOUNTING BRACKET FOR ELECTRICAL OUTLET BOXES

[76] Inventor: Lewis B. Medlin, P.O. Box 237, Blue Ridge, Va. 24064

[21] Appl. No.: 690,057

[22] Filed: Jan. 9, 1985

[51] Int. Cl.³ .............................................. H02G 3/08
[52] U.S. Cl. .................................... 220/3.9; 220/3.3; 220/3.5; 220/3.6
[58] Field of Search ................. 220/3.9, 3.3, 3.5, 3.6, 220/3.7

[56] References Cited

U.S. PATENT DOCUMENTS

| 2,252,953 | 8/1941 | Walters | 220/3.9 |
| 3,448,952 | 6/1969 | Swanquist et al. | 220/3.5 X |
| 4,135,337 | 1/1979 | Medlin | 220/3.3 X |
| 4,399,922 | 8/1983 | Horsley | 220/3.6 |
| 4,408,695 | 10/1983 | Balkwill et al. | 220/3.3 |
| 4,483,453 | 11/1984 | Smolik | 220/3.3 X |

Primary Examiner—Steven M. Pollard
Attorney, Agent, or Firm—B. B. Olive

[57] ABSTRACT

An outlet box (the term "outlet box" is also intended to encompass a junction box) mounting bracket has slots to accept the shanks of outlet box mounting screws to eliminate the necessity of removing the screws when assembling the outlet box to one side of the bracket and a dry wall ring to the opposite side of the bracket. The bracket has an L-shape with right angled plate portions on one or both sides of the bracket adapted to engage and be secured to side and front surfaces of a stud or the back of a wall and a recessed plate portion on the other side of the bracket containing the mentioned slots around an opening which registers with the interior chamber of the box and arranged to bring the outer surface of a dry wall ring in the same plane as the front outermost plane of the bracket.

19 Claims, 18 Drawing Figures

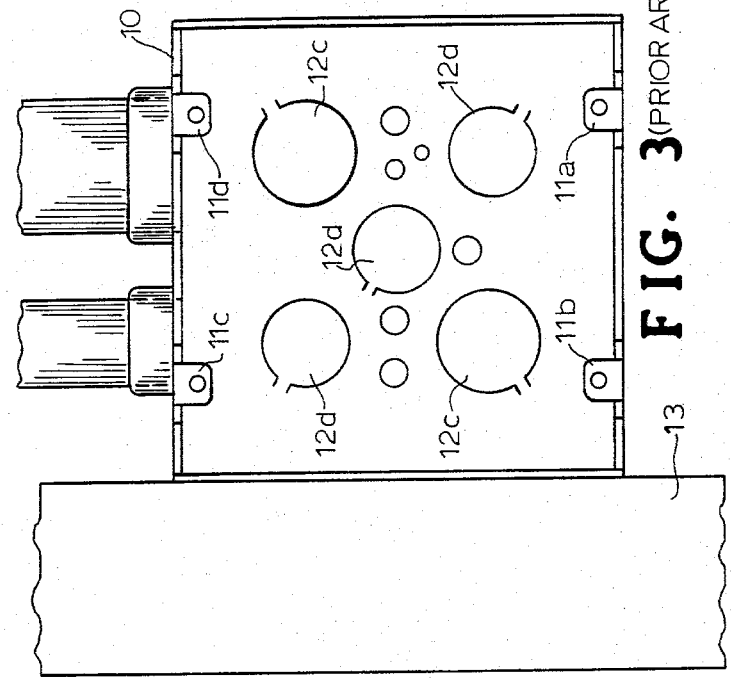
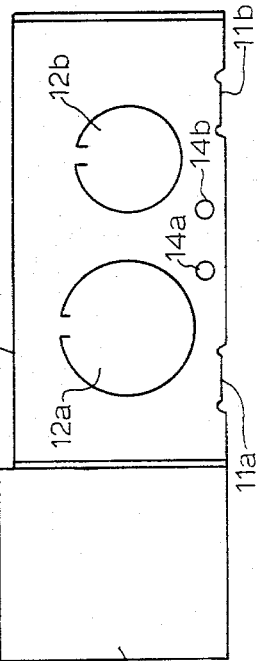
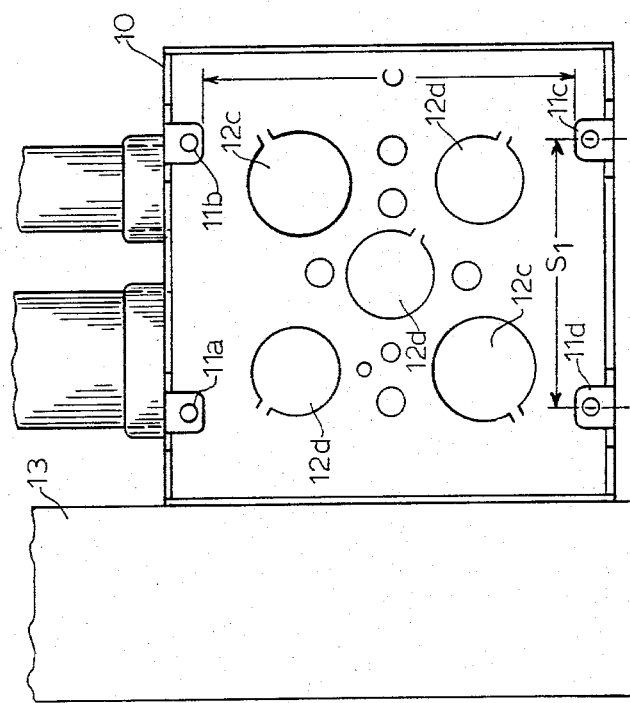
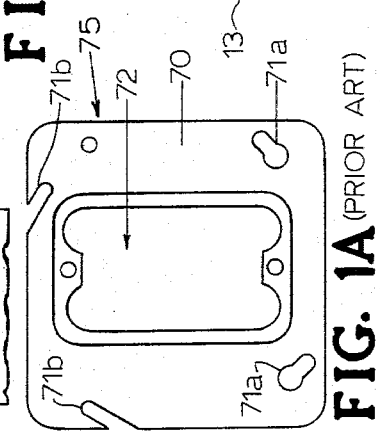
FIG. 1 (PRIOR ART)
FIG. 1A (PRIOR ART)
FIG. 2 (PRIOR ART)
FIG. 3 (PRIOR ART)

MOUNTING BRACKET FOR ELECTRICAL OUTLET BOXES

TECHNICAL FIELD

The present invention relates to brackets for mounting of electrical equipment and specifically for the mounting of electrical outlet and junction boxes (hereafter referred to only as outlet boxes) to vertical metal studs, wooden studs, ceilings, plaster or dry wall during building construction and/or repair.

BACKGROUND ART

An object of the present invention is to improve on commonly-used electrical outlet box mounting means and more specifically to improve on the type mounting means shown in U.S. Pat. Nos. 4,135,337 and 4,399,922, particularly for mounting a 4-11/16" box for which there is presently no adequate bracket. The present invention furthermore seeks to reduce time and labor requirements for installation of electrical outlet boxes and while so doing provide a mounting bracket which affords a relatively wide range of adjustability.

Outlet boxes in many instances, when mounted under prior art practices, are not in the proper angular relationship with the studs or other elements involved in the mounting arrangement. While the present invention is illustrated in the drawings herein as being adapted for use in walls, it is to be understood that the invention mounting means is applicable for securing such electrical outlet boxes, and the like, on ceilings, plaster or dry wall, where there may be no studs.

The preferred method for installing an outlet box is to mount the outlet box on a bracket secured to the stud rather than mounting the outlet box on the stud itself. In this preferred method, it is desirable to first install the bracket and then the outlet box. After these operations are completed and appropriate knock-out discs removed, it is then desirable to next secure the pipe or cable, then pull the wire, make up the wirings, joints, and splices and finally secure the dry wall ring to the bracket and box. Experience on the job dictates the described procedure as being effective to save both time and expense.

The bracket described in applicants prior art Pat. No. 4,135,337 provided a significant improvement over previously-available, box-mounting devices, particularly for the conventional four-inch square size outlet box. However, disadvantages existed which hampered the complete acceptance of the bracket of Pat. No. 4,135,337 when applied to the large 4-11/16 inch square size boxes. For the larger size boxes, it was found necessary to remove all of the outlet box mounting screws in order to attach the box to its mounting bracket after the bracket had been attached to the stud. The necessity to remove the box mounting screws arose irrespective of how the outlet box screw tabs were oriented with respect to the bracket. Another disadvantage resided in the fact that the bracket allowed no horizontal or vertical adjustment of the mounting screws with respect to the bracket. As another aspect of the prior art, the bracket described in Pat. No. 4,135,337 provided an offset only on the side of the bracket attached to the stud so as to offset the dry wall ring and thus reduce bulging of the finished dry wall plaster. However, this single offset arrangement has not been found completely satisfactory and a need has arisen to improve the manner in which the dry wall ring is offset on the bracket so as to provide further improvements in the reduction of the bulging of the finished dry wall or plaster.

U.S. Pat. No. 4,399,922 attempted to overcome some of the inconveniences of applicant's Pat. No. 4,135,337. However, the outlet mounting arrangement of Pat. No. 4,399,922 provided no vertical or horizontal adjustment of the outlet box in relation to the bracket and also required that the dry wall ring be attached before mounting the bracket. Thus, the working space within the outlet box becomes substantially restricted.

From the foregoing, it can be seen that a further improved mounting bracket for a large size box would be desirable. Even more desirable would be an improved mounting bracket which could be sized to fit either the standard large size box or the standard small size box and typical non-standard dry wall rings. More specifically, it becomes evident that there is a need for an improved mounting bracket which would allow an outlet box to be attached to its mounting bracket without having to remove all of the mounting screws, which would provide both vertical and horizontal adjustment of the outlet box with respect to the bracket, which would allow a maximum opening for wiring operations prior to final assembly of the dry wall ring, which would not require that the dry wall ring be assembled to the bracket before wiring the outlet box and finally which would provide improvements in the offset needed to eliminate bulging of the finished dry wall or plaster. The obtaining of these as well as other desirable features in an improved outlet mounting assembly thus becomes the object of the invention which along with other objects will become apparent as the description proceeds.

DISCLOSURE OF INVENTION

In accordance with the present invention, applicant provides a single thin sheet metal formed electrical outlet box mounting bracket primarily intended for standard large size boxes, i.e., 4-11/16 inch size boxes, having two screw tabs on each of two opposed side walls. The invention bracket provides for specially-arranged slots to alleviate the need when the outlet box tabs are horizontally oriented to remove screws before attaching the outlet box and/or dry wall ring and provides for installation of the outlet box to the bracket and stud facilitating the pulling of wire, making up of joints and installation of wiring devices inside the outlet box prior to attaching the dry wall ring. In the preferred embodiment at least four slots are positioned horizontally and four slots are positioned vertically to allow maximum versatility in positioning of the outlet box knock-out discs to accept conduit pipe or cable. The box-mounting portion of the invention bracket having the mentioned slots and opening is offset rearwardly from the face of the bracket so that when the bracket is mounted and the dry wall ring is positioned, there will be no bulging or breaking of the finished dry wall or plaster on either side. In second and third embodiments, there are provided only four vertical slots or only four horizontal slots. In the third embodiment, the invention bracket may be of reduced size with only four horizontal slots spaced for use with small size boxes, i.e., 4-inch square size, with only two diagonally-opposed screw tabs. A fourth embodiment adapts to stud or non-stud mounting.

BRIEF DESCRIPTION OF THE DRAWINGS

FIG. 1 is a front elevation view of a prior art four screw tab 4-11/16" electrical outlet box mounted to the side of a vertical stud with a large cable connected adjacent the stud and a small cable adjacent the larger cable connection and with the screw tabs vertically oriented.

FIG. 1A illustrates a representative prior art dry wall ring.

FIG. 2 is a top plan view of the prior art arrangement of FIG. 1 but with the cable connections removed to illustrate the large and small knock-out discs.

FIG. 3 is a front elevation view of the prior art electrical outlet box of FIG. 1 with the box rotated so that a small cable connection is adjacent the vertical stud to illustrate a typical wiring requirement.

BEST MODE FOR CARRYING OUT THE INVENTION

Figure 4:
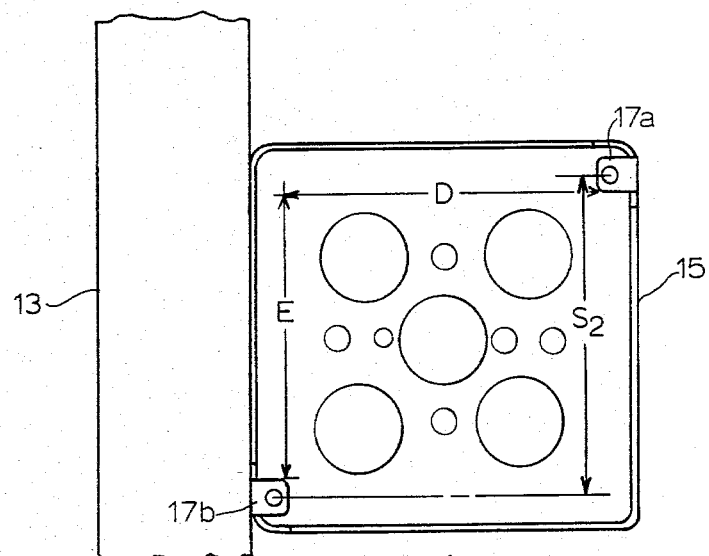
FIG. 4 is a front elevation view of a prior art two screw tab small, i.e., four inch size, electrical outlet box mounted to the side of a vertical stud.

The description will first describe various related prior art apparatus and practices in reference to FIGS. 1-6 to give background for the invention bracket described in reference to FIGS. 7-12 according to a first embodiment and in reference to FIGS. 13-17 in reference to second, third and fourth embodiments.

Referring initially to FIGS. 1 through 4 for background purposes, electrical outlet boxes 10 and 15 are typical of two types of boxes available on today's market and are illustrated installed according to prior art practice. The larger, i.e., standard square 4-11/16" size, box 10 of FIGS. 1 through 3 has four threaded tabs 11a, 11b, 11c and 11d which receive screws to hold a plaster/dry wall ring such as the illustrated ring 75 (FIG. 1A) having a thin flange 70, a central opening 72 and appropriate screw clearance holes or slots 71a, 71b. In the outside walls of box 10 are knock-out discs 12a, 12b, only two being shown. The knock-out discs are alternated such that a small or a large knock-out disc may be positioned adjacent the wall stud 13 according to construction requirements. FIGS. 1 and 3 illustrate how the large size box 10 may be rotated to position either a small or large knock-out disc adjacent stud 13. Box 10 is shown fastened to stud 13 by screws which pass through holes 14a, 14b into stud 13. Each wall of box 10 has a pair of holes 14a, 14b. This arrangement necessitates the fastening of box 10 to stud 13 prior to making wiring connections, etc. within box 10 whereas it would be desirable to fasten the box to the bracket only as in FIG. 5.

Figure 5:
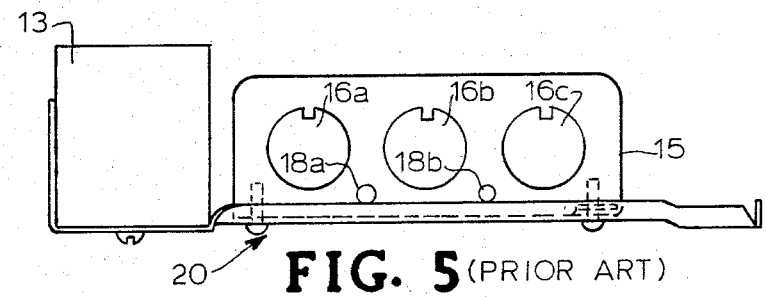
FIG. 5 is a top plan view of the small size box of FIG. 4 illustrating that the box has three equal size knock-out discs on each side for cable connections and illustrating a prior art outlet box mounting bracket of a type made and sold by applicant.

FIGS. 4 and 5 illustrate for further background the type of small size, i.e., 4" size, outlet box 15 which is adapted to receive numerous cable connections of like diameter around the periphery of the box 15. As seen in FIG. 5, the small size box 15 has three knock-out discs 16a, 16b and 16c situated in each of the sidewalls thereof. The conventional small size box 15 has two threaded tabs 17a, 17b located diagonally opposite each other. Each side has a pair of screw holes 18a, 18b which in the past have been used for connecting box 15 to stud 13.

Figure 6:
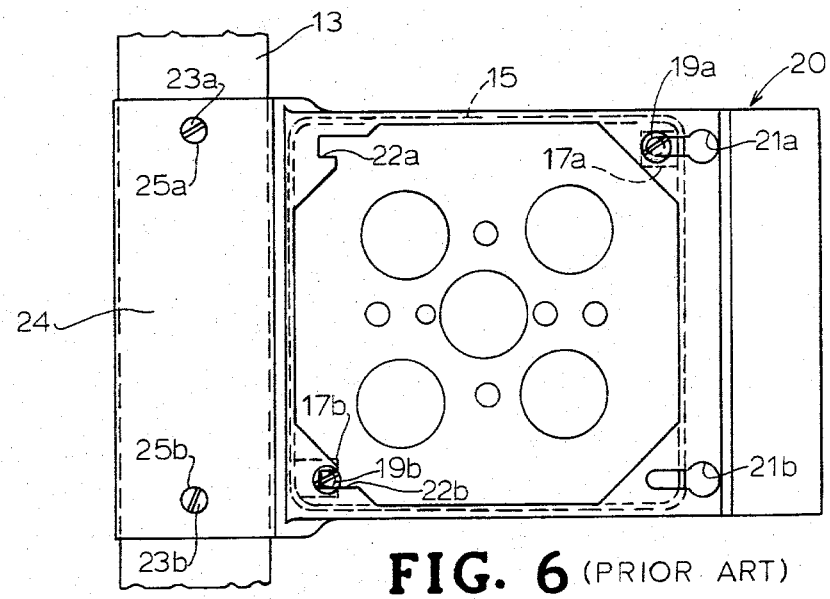
FIG. 6 is a front elevation view of the small size outlet box of FIGS. 4 and 5 installed in a prior art outlet box mounting bracket of a type presently manufactured and sold by applicant.

FIGS. 5 and 6 as further background illustrate in conjunction with the small size box 15 a small size outlet box mounting bracket 20 which applicant has previously manufactured and sold. Box 15 is mounted on bracket 20 by means of screws 19a, 19b which pass through slotted holes 21a, or 21b and slots 22a or 22b (see FIG. 6). Box 15 may be appropriately positioned and horizontally adjusted on bracket 20 by sliding to the left or right on screws 19a, 19b. The bracket 20 and box 15 unit is secured to stud 13 by screws 23a, 23b which pass through L-section 24 of bracket 20 by way of holes 25a, 25b. Bracket 20 provides an improved offset as compared to the bracket of Pat. No. 4,135,337, provides horizontal adjustability and allows the small size box to be installed with the mounting screws installed but lacks all of those features needed in practice for mounting a standard large size box.

Reference is next made to FIGS. 7 through 12 which are illustrative of the electrical outlet box mounting bracket 30 of the present invention according to a first embodiment. Bracket 30 primarily intended for mounting large size outlet boxes is preferably formed of a small section of sheet metal and is adapted to fit snugly against side and front surfaces of metal stud 13 and integrally secured thereto. Bracket 30 assumes an L-shape and comprises a flat arm 31 and at a right angle thereto a laterally extending flat web 32 which is an integral extension of arm 31. Arm 31 and web 32 are each provided with a pair of stud-mounting holes. Supporting member 32 is bounded by offset 33 and continues to extend laterally outward from arm 31 as flat-mounting member 34 bounded at its outer end by offset 35 from which extends laterally the flat end member 36 in the same plane as member 32. An inwardly-turned, right-angled, strengthening flange 37 surrounds members 34 and 36. Laterally-extending mounting member 34 is provided with a substantially-large, square-shape cutout or opening 40 with outwardly rounded corners 41 and which is just slightly smaller than the interior dimensions of the large size electrical outlet box 10. In a preferred embodiment, dimensions A and B (FIG. 7) are equal and are substantially equal to dimension C (FIG. 1), the tab clearance for the standard large size box.

Member 34 has two opposed pairs of open-ended, laterally-spaced, horizontally-extending slots 45a, 45b and 46a, 46b. Slots 45a, 45b are formed on straight left edge 45 and as viewed in FIG. 7 extend to the left whereas slots 46a, 46b form on straight right edge 46 and extend to the right. As seen from FIGS. 7, 9, 10 and 12, slots 46a, 46b are longer, preferably ½ inch, than slots 45a, 45b, preferably ¼ inch. This added length allows for both lateral or horizontal adjustment of box 10 on bracket 30 and also allows box 10 to be mounted on bracket 30 with all of the mounting screws in place when box 10 is oriented as in FIG. 2. In addition, member 34 has two opposed pairs of vertically extending open-ended slots 47a, 47b and 48a, 48b and of substantially equal length, preferably ¼ inch. Slot spacings $D_1$ and $D_2$ (FIG. 7) equal the tab screw spacing $S_1$ of FIG. 1. Slots 47a, 47b extend upward from straight top edge 47 whereas slots 48a, 48b extend downward from straight bottom edge 48 (see FIG. 7). All of the slots are sufficiently wide, preferably about ¼ inch, to provide loose clearance for the mounting screws the shanks of which are typically 3/16" size but sufficiently narrow to retain the screw heads. Thus, it is clear that bracket 30 offers a large unobstructed opening 40 and substantial horizontal and at least limited vertical adjustment thereof when used for mounting the typical large size outlet box 10 illustrated in FIGS. 1-3.

In use, bracket 30 is put into place with arm 31 abutting stud 13 on the side thereof and with web 32 abutting the face of stud 13. Web 32 has a pair of holes 32a, 32b through which appropriate mounting screws may be passed to secure bracket 30 to stud 13. Bracket 30 alternatively may be secured to stud 13 by holes 31a, 31b in arm 31 with appropriate screws fastening into stud 13. Either pair of holes may be used to fasten bracket 30 to metal stud 13 although it is not ordinarily necessary to use all four. After bracket 30 is mounted on stud 13, the large size outlet box 10 is mounted on bracket 30 with the screw tabs oriented vertically as in FIG. 10 or horizontally as in FIG. 12. One top screw 55 and one diagonally opposed bottom screw 56 are used to initially mount box 10 in place on bracket 30. Thus, screws 55, 56 loosely but securely hold box 10 attached to bracket 30 for further steps of installation.

Appropriate knock-out discs 12a, 12b or 12c, 12d may be selected and removed, either before or after outlet box 30 is installed on bracket 30. After box 30 is installed, wiring is pulled to the box and wiring connections, joints and splices are made therein. Lastly, although not shown, an appropriate size and type dry wall ring such as ring 75 (FIG. 1A) is secured to bracket 10. The selected conventional dry wall ring slides in place on two screws holding bracket 30 and box 10 in place and which can later be tightened to secure the dry wall ring on member 34 between offsets 33 and 35. Different manufacturers' different ring configurations and the use of two screws only to hold the box, bracket and ring together are readily accommodated by the invention bracket. Offset dimension T (FIGS. 8 and 11) is made substantially equal to the thickness of the dry wall ring flange 70 which minimizes bulging of the finished dry wall or plaster. Dimension $F_1$ of left surface 39 (FIG. 7) is sufficiently wide to accommodate varying widths of dry wall ring flanges. Dimension $F_2$ of right surface 38 is made sufficiently wide to permit a dry wall ring open or keyhole slot to rotate on one screw, e.g. screw 45b (FIG. 12), when another diagonally opposite dry wall ring open or keyhole slot is moved to engage another diagonally opposite screw, e.g., screw 46b (FIG. 12) and while permitting the dry wall flange to slide on surface 38.

Figure 10:
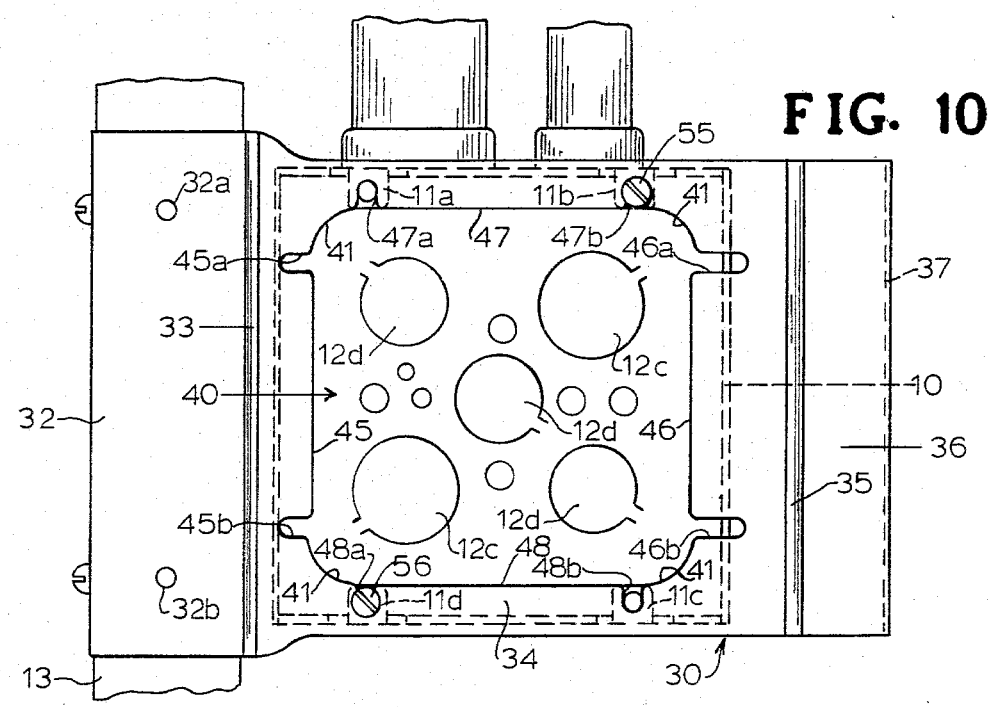
FIG. 10 is a front elevation view of the bracket of FIGS. 7-9 of the present invention with the bracket mounted on a prior art large size, four-tab electrical outlet box.
Figure 11:
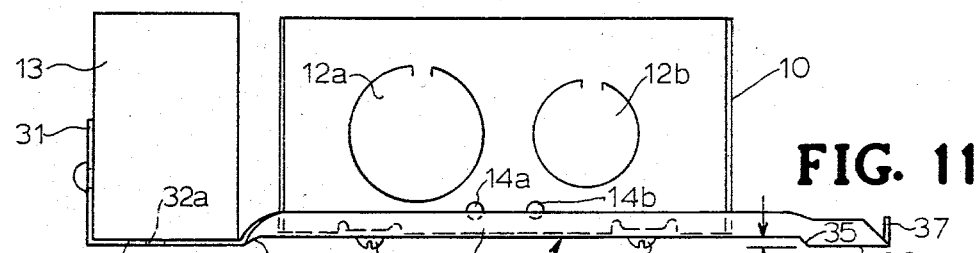
FIG. 11 is a top plan view of the bracket of FIG. 10 mounted on the outlet box of FIG. 10 with the cable connections removed.
Figure 12:
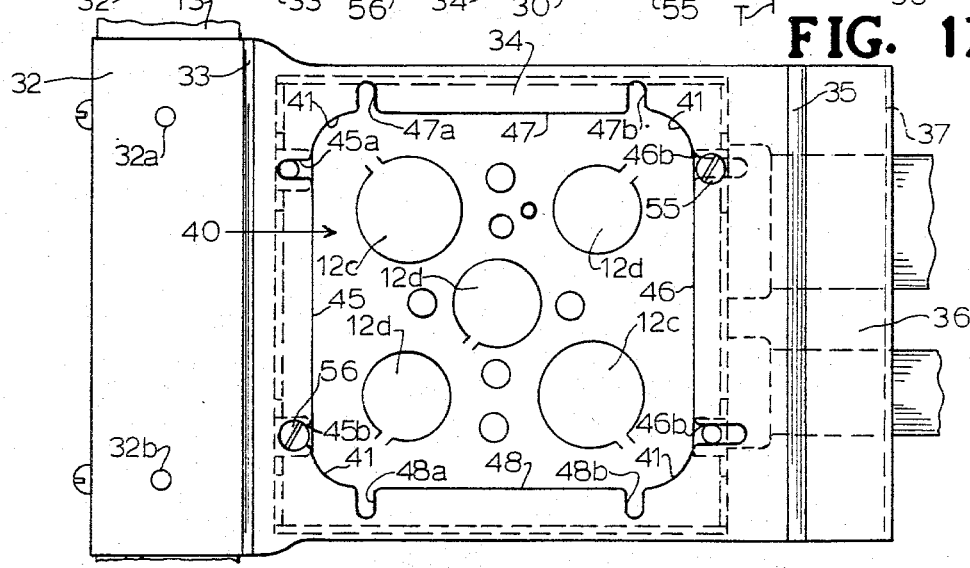
FIG. 12 is a front elevation view of the bracket of FIGS. 10 and 11 mounted on the large size outlet box of FIGS. 10 and 11 but with the outlet box rotated ninety degrees clockwise so that the cable connections are made from the side illustrating the adaptability of the invention bracket with various cable connection arrangements.
Figure 13:
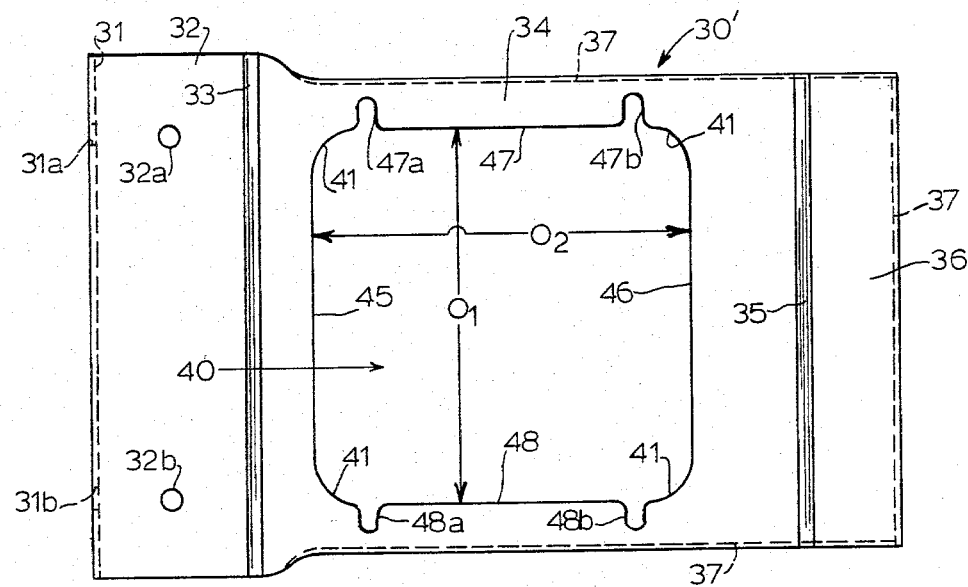
FIG. 13 illustrates a modified bracket adaptable for either large or small size boxes.

FIGS. 10 and 12 illustrate how outlet box 10 may be positioned either horizontally or vertically and in either orientation mounted on bracket 30. The FIG. 10 arrangement utilizes slots 47a, 47b and 48a, 48b whereas the FIG. 12 arrangement utilizes slots 45a, 45b and 46a, 46b.

When box 10 is oriented as in FIG. 10, only one or two mounting screws on the same sidewall can be secured in the respective screw tabs before box 10 is mounted. However, once the outlet box 10 is mated to the outlet box screw tabs as in FIG. 10, one or two mounting screws on both sidewalls can be installed and all wiring completed prior to installing the dry wall ring. In view of the gripping effect of ledge 47 on box 10, one tightly-secured mounting screw is normally sufficient for the initial wiring operation. When box 10 is oriented as in FIG. 12, either two or four mounting screws can be in place without preventing assembly of box 10 to bracket 30. Thus, with either orientation box 10 can be mounted with at least one mounting screw in place and in the case of the FIG. 12 orientation with two or more mounting screws in place.

The invention provides for having at least four horizontally oriented mounting slots or at least four vertically oriented mounting slots in the box mounting bracket of the invention. Preferably, a set of four horizontal as well as a set of four vertical mounting slots are provided as in FIGS. 7-12. In the second embodiment bracket 30' of FIG. 13 only the horizontal mounting slots are provided suited to the FIG. 12 box orientation and in the third embodiment bracket 30" of FIG. 14 only the vertical mounting slots are provided suited to the FIG. 10 orientation. In the described second and third embodiments there is preserved the advantages of a substantial unobstructed work opening 40 and adjustability either horizontally (FIG. 13) or vertically (FIG. 14) and also the advantage of being able to mount box 10 on the bracket with at least one mounting screw installed.

Figure 14:
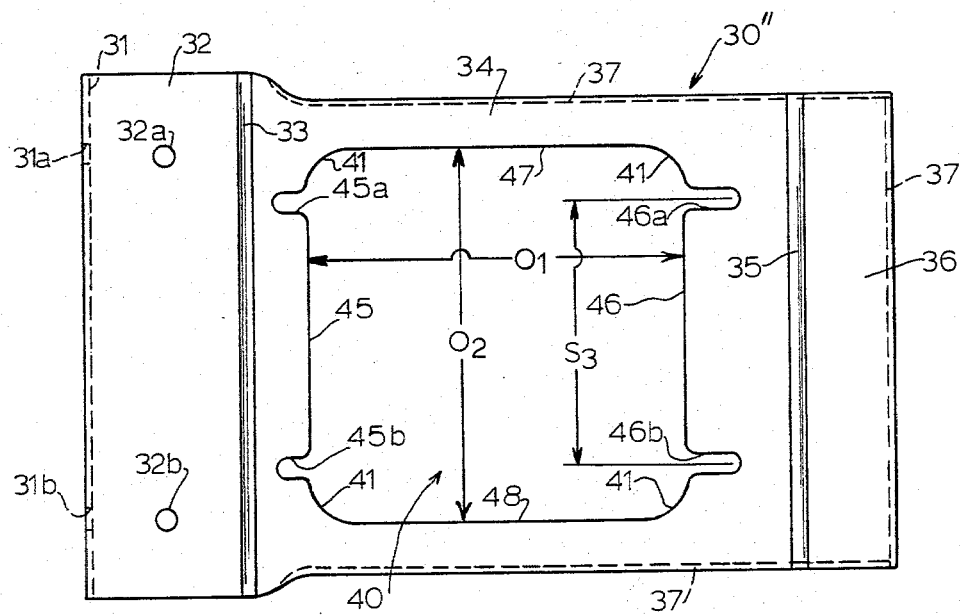
FIG. 14 illustrates a further modified bracket adaptable for either large or small size boxes.

When the spacing S-2 of FIG. 4 is made equal to the spacing S-3 of FIG. 14 and the opening dimensions 0-1 and 0-2 in FIG. 14 are made substantially equal to the dimensions D and E of FIG. 4 bracket 30" of FIG. 14 readily adapts to utility as a small box mounting bracket with all the advantages previously explained for the large mounting box of the invention.

Figure 7:
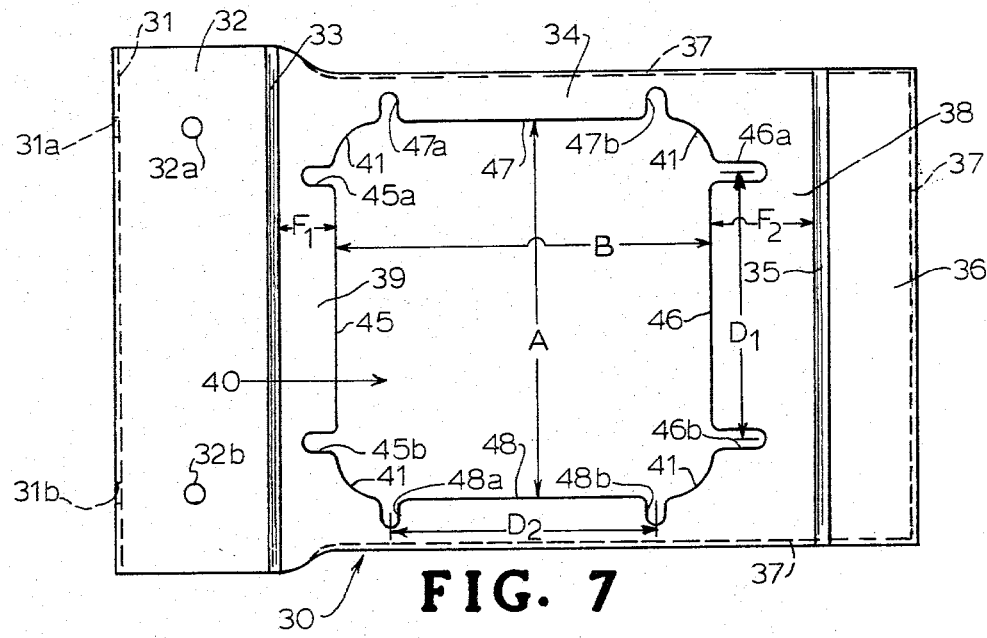
FIG. 7 is a front elevation view of the electrical outlet box mounting bracket of the present invention for standard large size, i.e., 4-11/16", outlet boxes.
Figure 8:
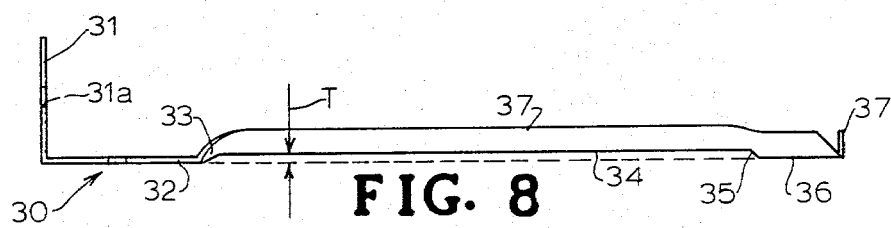
FIG. 8 is a top plan view of the bracket of FIG. 7.
Figure 9:
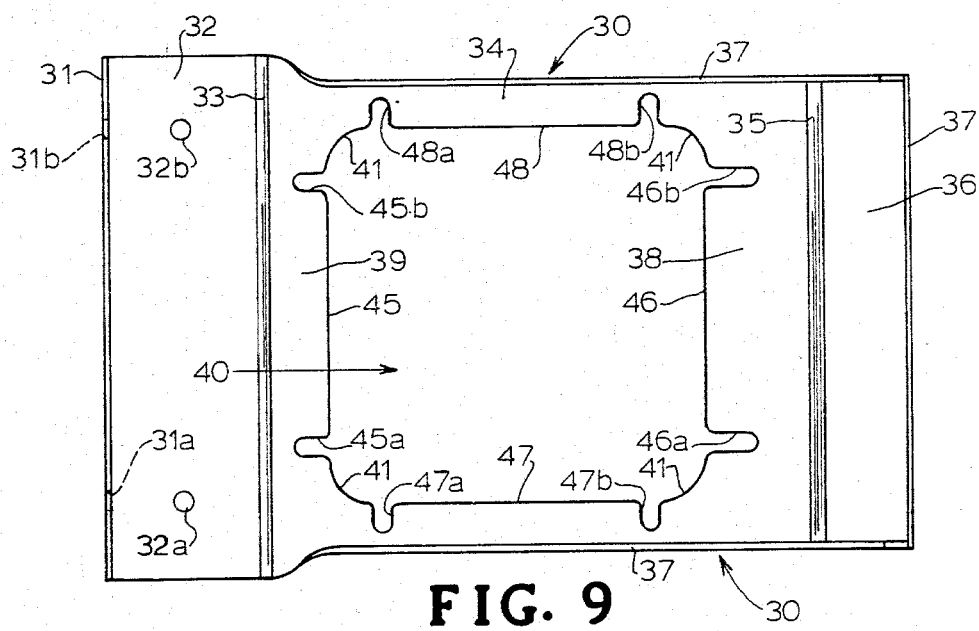
FIG. 9 is a rear elevation view of the bracket of FIGS. 7 and 8.
Figure 15:
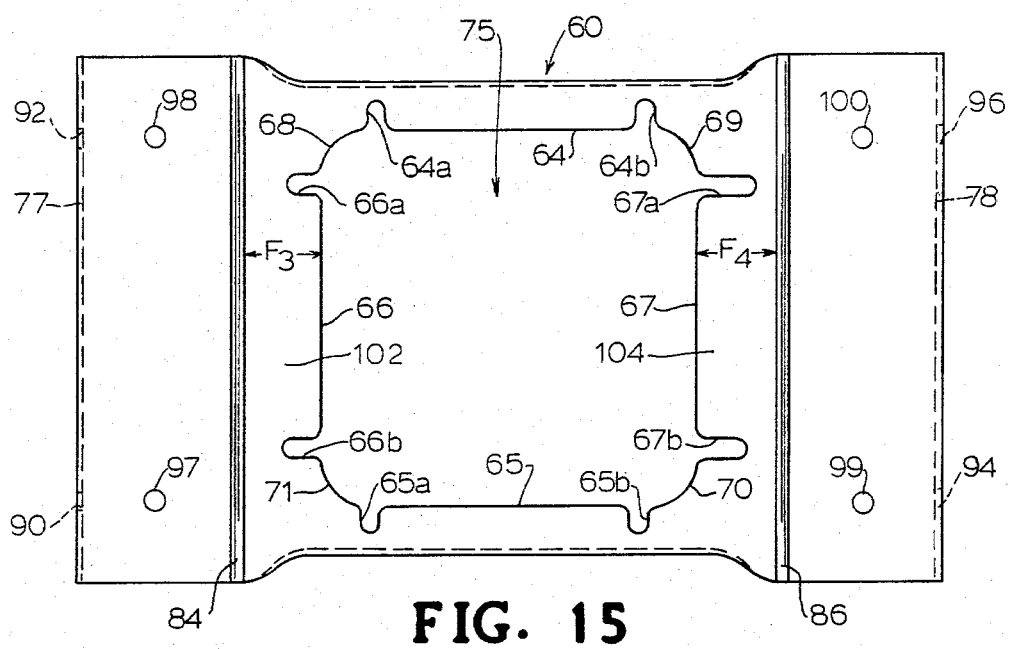
FIGS. 15, 16 and 17 represent respectively top plan, elevation and bottom plan views of a fourth embodiment adaptable for either stud or wall mounting.
Figure 16:
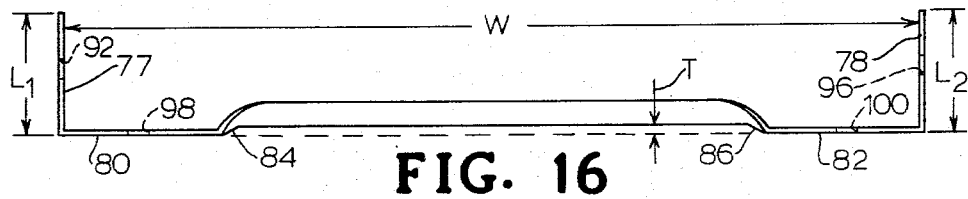
Figure 17:
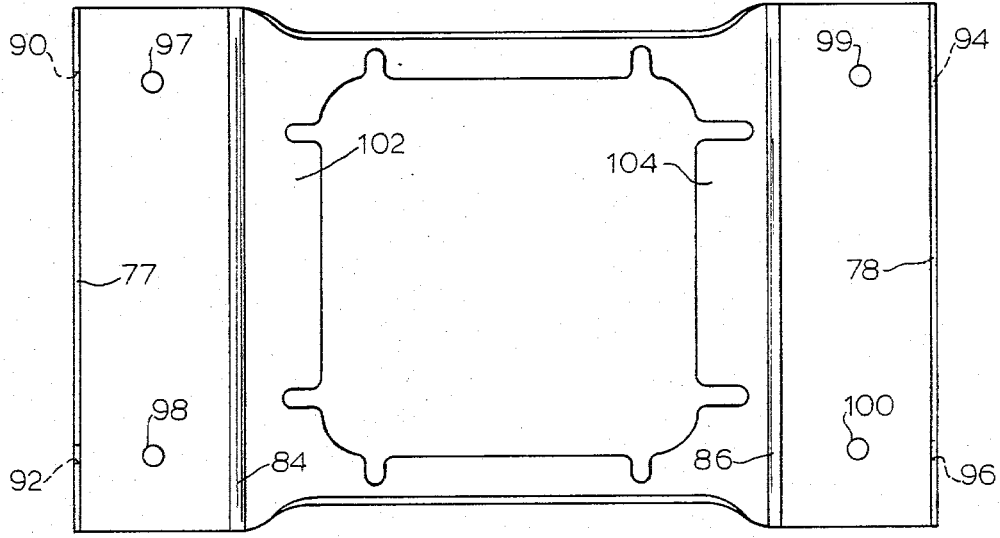

In a fourth embodiment illustrated in FIGS. 15-17, there is shown a modified bracket 60 suited to being attached to a single stud, to two closely-spaced studs or directly to the back of a wall such as a dry wall sheet. Bracket 60 is characterized by the same vertical and horizontal slot arrangement previously described in connection with the first embodiment illustrated in FIGS. 7-12. More specifically, bracket 60 is illustrated as having a pair of vertically-oriented slots 64a, 64b on upper straight edge 64, another pair of vertically-oriented slots 65a, 65b on bottom straight edge 65, a pair of horizontally-oriented slots 66a, 66b on left straight edge 66 and another pair of horizontally-oriented slots 67a, 67b on right straight edge 67. Outwardly curved corners 68-71 preserve the previously-discussed, relatively-large unobstructed opening 75 defined by the mentioned straight and curved edges. Bracket 60 has a pair of opposed flat arms 77, 78 joined to opposed flat web portions 80, 82 and opposed offsets 84, 86 on opposite sides of the flat plaster ring mounting surfaces surrounding opening 75. Bracket 60 is further characterized by having a pair of mounting holes 90, 92 in arm 77, mounting holes 94, 96 in arm 78, mounting holes 97, 98 in web 80 and mounting holes 99, 100 in web 82. Left surface 102 has a width $F_3$ equal to the width $F_4$ of right surface 104. Such widths are equivalent to the previously-mentioned width $F_2$ of right surface 38 (FIG. 7). Thus, bracket 60 is designed to allow the dry wall ring to slide on either left surface 102 or right surface 104 when the open or keyhole slot of a dry wall ring is rotating on one screw and a diagonally-opposite open or keyhole slot on the dry wall ring is being moved towards another diagonally-opposite screw. In an alternate construction, width $F_3$ (FIG. 15) may be made equal to width $F_1$ (FIG. 7).

Bracket 60 can be attached directly to the back of a wall such as the back of a dry wall sheet by screws attached to one or both of webs 80, 82. Alternatively, bracket 60 can be attached to a stud by using either one or both of arm 79 and web 80 or one or both of arm 78 and web 82. Additionally, for extremely secure mounting as, for example, in a vibration-sensitive application, the studs can be closely spaced to correspond to the width W of bracket 60 and securement made utilizing both arm 77 and web 80 as well as arm 78 and web 82. The lengths $L_1$, $L_2$ of the respective arms 77, 78 may be short for stud or wall mounting, may have one short for stud mounting and one long and equal to the wall interior space width for stiffening or both may be long and effective as stiffening arms. While a single bracket stiffening arm is known as in prior art Pat. No. 4,399,922 (FIGS. 6-8), the present bracket invention offers new advantages over such prior art.

In summary, it can be seen that the unique combination of slots, offsets, web, arm and mounting surfaces of the invention provides in a single mounting system the following job-proven and practical advantages for mounting the standard 4-11/16 inch size square large outlet box:

1. Allows the outlet box to be oriented in any position by 90° turns so as to get the knock-outs positioned wherever required for the job.

2. Enables the plaster ring to be installed after all of the wiring within the outlet box has been completed.

3. Allows the standard large size outlet box to be mounted with plaster rings made by different manufacturers and requiring different screws to be used when mounting the plaster ring onto the invention bracket.

4. Enables the outlet box to be captured in any orientation so as to prevent the outlet box falling off the bracket during wiring operations either within or leading to the outlet box.

5. Enables an open or keyhole slot of the plaster ring to rotate on one screw while a diagonally-opposite open or keyhole slot is positioned to engage a diagonally-opposite screw and while the plaster ring flange slides on a bracket surface between the offsets and on one side of the opening.

6. Provides a maximum size opening within the bracket defined by interconnected straight, curved and slot edges thereby eliminating wire snagging and providing opportunity for wiring operations to be completed within the outlet box even when the electrician is wearing gloves as, for example, in cold weather or rough working conditions.

7. Utilizing the horizontally-oriented slots allows the box to be installed using a pair of diagonally-opposite screws loosely installed in the outlet box before the outlet box is mounted on the bracket and the outlet box to be wired even when the electrician is wearing gloves without running the risk of the outlet box falling off the bracket.

8. Utilizing the vertically-oriented slots also allows the outlet box to be held on the bracket by a pair of diagonally-opposite loosely installed screws and wired by the electrician wearing gloves without running the risk of the outlet box falling off the bracket.

9. Since plaster rings unlike outlet boxes are not standardized, accommodates to a wide range of plaster ring constructions of different flange width, different keyhole and open slot or part keyhole and part open slot arrangements and different requirements of where the tab screws have to be located for mounting purposes.

10. Provides offsets on both sides of the bracket and thus the most desirable form of offset to minimize bulging of the drywall or plaster surface.

11. Enables wiring to be completed with the outlet box and bracket loosely assembled before installing the drywall ring.

12. Adapts to being secured either to a stud or to the back of a wall.

13. Allows the outlet box to be adjusted with respect to the bracket when either the vertically oriented or horizontally oriented slots are being used.

14. While primarily intended for mounting the standard 4-11/16 inch size large outlet box, retains essentially all of the invention advantages when the invention bracket, in a reduced size, is utilized for mounting the standard 4-inch size small outlet box.

15. For manufacturing purposes minimizes the cost of tooling, permits the bracket to be formed of a single, thin, rigid sheet of metal with an easily-formed, substantially-large opening defined by the edges of the rounded corners, and upper, lower, right and left straight edges.

16. As compared to prior art brackets (See FIG. 6 for example) the invention bracket eliminates the need for keyhole-type slots, eliminates straight edges at the corners of the opening and instead provides curved corner edges, and provides a slot arrangement in which all of the open slots extend outwardly from the opening, with the axis of each slot being oriented perpendicular to the straight edge of the opening from which the slot extends.

17. Recognizing that the term "outlet box" has been used throughout the description and is hereafter used in the claims to refer to both what are conventionally called "outlet boxes" as well as to what are conventionally called "junction boxes", the invention bracket affords all of the previously set forth advantages either for the type box used at the end use or to the type box used with no attached wiring device.

18. In all of the illustrated embodiments there is provided an improved bracket having at least the following features:

(a) offsets on both sides of the opening;

(b) at least four slots leading outwardly from the opening and oriented in a common vertical or horizontal direction;
(c) a pair of front mounting web surfaces on opposite sides of the opening adapted to either stud or wall mounting;
(d) at least one arm mounting surface extending rearwardly and perpendicular to the front web surfaces;
(e) right and left flange ring mounting surfaces on opposite sides and adjacent to the opening at least one of which is sufficiently wide to permit a flange ring open or keyhole slot to pivot on one mounting screw and slide on the bracket while a diagonally-opposite flange ring open or keyhole slot is moved to engage a diagonally-opposite mounting screw; and
(f) provides an opening defined by straight right, left, top and bottom edges and outwardly-curved corners and which is substantially the same size as the outlet box opening.

What is claimed is:

1. An electrical outlet box mounting assembly, comprising:
   (a) a square outlet box having integrally joined base and sidewalls formed with a selected number and size of knock-out discs and on the outer edge of each sidewall of one opposed pair of said sidewalls having a pair of inwardly-directed, laterally-spaced screw receiving tabs with threaded holes and overlying an interior chamber formed by said box with the pair of tabs on one said sidewall opposing and being laterally spaced apart the same distance as the pair of tabs on the opposite said sidewall;
   (b) a dry wall ring having a central opening and a peripheral plate flange with screw clearance openings arranged for being mated to said tab threaded holes;
   (c) an L-shaped unitary mounting bracket formed of a single piece of stiff sheet material, including:
      (i) first and second rectangular plate portions in right angular relation adapted for securement adjacent respective side and front surfaces of a construction stud; and
      (ii) a plate body portion extending outwardly from said second plate portion having:
         (aa) at an outer end a third rectangular flat plate end portion in the same plane as the plane of said second plate portion;
         (bb) between said third plate portion and second plate portion having a fourth rectangular plate portion in a plane offset from and substantially parallel to the plane of said second and third plate portions by an amount substantially equal to the thickness of said dry wall ring flange, said fourth plate portion plane being established by parallel offsets formed on both sides of said fourth plate portion;
         (cc) a substantially square opening in said fourth plate portion defined by opposed straight parallel upper and lower and opposed straight parallel right and left side edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;
         (dd) a first pair of laterally spaced screw slots extending from the said upper edge of said fourth plate portion opening, said slot lateral spacing being equal to the lateral spacing between the threaded holes in each of said pair of tabs;
         (ee) a second pair of laterally spaced screw slots extending from the said lower edge of said fourth plate portion opening, said second pair of slots having a depth equal to the depth of said first pair of slots and sufficient for at least limited vertical box mounting adjustment on said bracket and being positioned opposite to said first pair of slots, said lateral spacing between said second pair of slots also being equal to the lateral spacing between the threaded holes in each of said pair of tabs;
         (ff) a third pair of laterally spaced screw slots extending from the left edge of said fourth plate portion opening and having a lateral spacing and depth substantially equal to the depth of said first and second pair of slots;
         (gg) a fourth pair of laterally spaced screw slots extending from the right edge of said fourth plate portion opening, said fourth pair of slots being positioned opposite to the position of said third pair of slots and having a lateral spacing equal thereto and a depth substantially twice the depth of said first, second and third pair of slots enabling horizontal box mounting adjustment on said bracket;
         (hh) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion;
         (ii) between each pair of slots at the corners of said opening an outwardly curved edge serving as a continuation of the slot edge on either side thereof; and
   (d) a plurality of screws adapted for being loosely fitted in said slots and for being secured in said tab threaded holes,
whereby when an electric outlet box is positioned adjacent the inner side of said fourth plate portion in position with respect thereto so that the interior of said electric outlet box is accessible through said fourth plate portion opening and a dry wall ring is fixed to the outer side of said fourth plate portion, said slots enable said junction box, bracket and dry wall ring to be held in operative position with screws passed through said slots and secured in said tab-threaded holes independent of said tabs being oriented to mate with said right and left edges or alternatively with said upper and lower edges surrounding said opening and whereby the outer surface of the flange of said ring is maintained when said screws are tightened in substantially the same plane as the outer surface of said second and third plate portions.

2. An assembly as claimed in claim 1 wherein said bracket is formed of sheet metal and includes inwardly turned stiffening edge portions surrounding selected said plate portions.

3. An electrical outlet box mounting assembly, comprising:
  (a) a square outlet box having integrally joined base and sidewalls formed with a selected number and size of knock-out discs and on the outer edge of each sidewall of one opposed pair of said sidewalls having a pair of inwardly-directed, laterally-spaced screw-receiving tabs with threaded holes and overlying an interior chamber formed by said box with the pair of tabs on one said sidewall opposing and being laterally spaced apart the same distance as the pair of tabs on the opposite said sidewall;
  (b) a dry wall ring having a central opening and a peripheral plate flange with screw clearance openings arranged for being mated to said tab threaded holes;
  (c) an L-shaped unitary mounting bracket formed of a single piece of stiff sheet material, including:
    (i) first and second rectangular plate portions in right angular relation adapted for securement adjacent respective side and front surfaces of a construction stud; and
    (ii) a plate body portion extending outwardly from said second plate portion having:
      (aa) at an outer end a third rectangular flat plate end portion in the same plane as the plane of said second plate portion;
      (bb) between said third plate portion and second plate portion having a fourth rectangular plate portion in a plane offset from and substantially parallel to the plane of said second and third plate portions by an amount substantially equal to the thickness of said dry wall ring flange, said fourth plate portion plane being established by parallel offsets formed on both sides of said fourth plate portion;
      (cc) a substantially square opening in said fourth plate portion defined by opposed straight parallel upper and lower and opposed straight parallel right and left side edges and outwardly curved corner edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;
      (dd) a first pair of laterally spaced screw slots extending from the upper edge of said fourth plate portion opening, said slot lateral spacing being equal to the lateral spacing between the threaded holes in each of said pair of tabs; and
      (ee) a second pair of laterally spaced screw slots extending from the said lower edge of said fourth plate portion opening, said second pair of slots having a depth equal to the depth of said first pair of slots and sufficient for at least limited vertical box mounting adjustment on said bracket and being positioned opposite to said first pair of slots, said lateral spacing between said second pair of slots also being equal to the lateral spacing between the threaded holes in each of said pair of tabs;
      (ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and
  (d) a plurality of screws adapted for being loosely fitted in said slots and for being secured in said tab threaded holes,
whereby when an electric outlet box is positioned adjacent the inner side of said fourth plate portion in position with respect thereto so that the interior of said electric outlet box is accessible through said fourth plate portion opening and a dry wall ring is fixed to the outer side of said fourth plate portion, said slots enable said junction box, bracket and dry wall ring to be held in operative position with screws passed through said slots and secured in said tab-threaded holes with said tabs oriented to mate with said upper and lower edges surrounding said opening and whereby the outer surface of said ring flange when said screws are tightened is maintained in substantially the same plane as the outer surface of said second and third plate portions.

4. An assembly as claimed in claim 3 wherein said bracket is formed of sheet metal and includes inwardly turned stiffening edge portions surrounding selected said plate portions.

5. An electrical outlet box mounting assembly, comprising:
  (a) a square outlet box having integrally joined base and sidewalls formed with a selected number and size of knock-out discs and on the outer edge of each sidewall of one opposed pair of said sidewalls having a pair of inwardly-directed, laterally-spaced, screw-receiving tabs with threaded holes and overlying an interior chamber formed by said box with the pair of tabs on one said sidewall opposing and being laterally spaced apart the same distance as the pair of tabs on the opposite said sidewall;
  (b) a dry wall ring having a central opening and a peripheral plate flange with screw clearance openings arranged for being mated to said tab threaded holes;
  (c) an L-shaped unitary mounting bracket formed of a single piece of stiff sheet material, including:
    (i) first and second rectangular plate portions in right angular relation adapted for securement adjacent respective side and front surfaces of a construction stud; and
    (ii) a plate body portion extending outwardly from said second plate portion having:
      (aa) at an outer end a third rectangular flat plate end portion in the same plane as the plane of said second plate portion;
      (bb) between said third plate portion and second plate portion having a fourth rectangular plate portion in a plane offset from and substantially parallel to the plane of said second plate portions by an amount substantially equal to the thickness of said dry wall ring flange, said fourth plate portion plane being established by parallel offsets formed on both sides of said fourth plate portion;

(cc) a substantially square opening in said fourth plate portion defined by opposed straight parallel upper and lower and opposed straight parallel right and left side edges and outwardly curved corner edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;

(dd) a first pair of laterally spaced screw slots extending from the left edge of said fourth plate portion opening, said slot lateral spacing being equal to the lateral spacing between the threaded holes in each of said pair of tabs; and (ee) a second pair of laterally spaced screw slots extending from the right edge of said fourth plate portion opening, said second pair of slots being positioned opposite to the position of said first pair of slots and having a lateral spacing equal thereto and a depth substantially twice the depth of said first pair of slots enabling horizontal box mounting adjustment on said bracket;

(ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw installed in another diagonally opposite said tab threaded hole, the bottom surface of said dry wall ring is able to slide on said fourth plate portion; and (d) a plurality of screws adapted for being loosely fitted in said slots and for being secured in said tab threaded holes, whereby when an electric outlet box is positioned adjacent the inner side of said fourth plate portion in position with respect thereto so that the interior of said electric outlet box is accessible through said fourth plate portion opening and a dry wall ring is fixed to the outer side of said fourth plate portion, said slots enable said outlet box, bracket and dry wall ring to be held in operative position with screws passed through said slots and secured in said tab-threaded holes with said tabs oriented to mate with said right and left edges surrounding said opening and whereby the outer surface of said ring is maintained in substantially the same plane as the outer surface of said second and third plate portions.

6. An assembly as claimed in claim 5 wherein said bracket is formed of sheet metal and includes inwardly turned stiffening edge portions surrounding selected said plate portions.

7. In an electrical outlet box mounting assembly of the type having:

(a) a square outlet box having integrally joined base and sidewalls formed with a selected number and size of knock-out discs and on the outer edge of each sidewall of one opposed pair of said sidewalls having at least one inwardly-directed, screw receiving tab with a threaded hole and positioned to provide at least one pair of diagonally opposite said tabs overlying an interior chamber formed by said box;

(b) a dry wall ring having a central opening and a peripheral plate flange with screw clearance openings arranged for being mated to said tab threaded holes;

the improvement comprising:

(c) an L-shaped unitary mounting bracket formed of stiff sheet material, including:

(i) first and second contiguous rectangular plate portions in right angular relation at a first end of said bracket; and (ii) a plate body portion extending outwardly from said second plate portion having:

(aa) at an outer end a third rectangular flat plate end portion in the same plane as the plane of said second plate portion;

(bb) between said third plate end portion and second plate portion having a fourth rectangular plate portion in a plane offset from and parallel to the plane of said second plate portion by an amount substantially equal to the thickness of said dry wall ring flange, said fourth plate portion plane being established by parallel offsets formed on both sides of said fourth plate portion;

(cc) a substantially square opening in said fourth plate portion defined by opposed straight parallel upper and lower and opposed straight parallel right and left side edges and corner edges formed in said fourth plate portion around said opening, said right and left edges being parallel to said offsets and said opening being sized to register with the interior chamber of said box with the width of said opening being substantially equal to the width of said box;

(dd) a first pair of laterally spaced screw slots matable with said tabs extending from a first selected straight edge of said fourth plate portion opening;

(ee) a second pair of laterally spaced screw slots matable with said tabs extending from a second selected straight edge of said fourth plate portion opening opposite said first selected edge of said fourth plate portion opening, said second pair of slots having a depth at least equal to the depth of said first pair of slots for at least limited box mounting adjustment on said bracket in the direction in which said slots are oriented and being positioned opposite to said first pair of slots;

(ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and (d) a plurality of screws adapted for being loosely fitted in said slots and for being secured in said tab threaded holes, whereby when an electric outlet box is positioned adjacent the inner side of said fourth plate portion in position with respect thereto so that the interior of said electric outlet box is accessible through said fourth plate portion opening and a dry wall ring is fixed to the outer side of said fourth plate portion, said slots enable said junction box, bracket and dry wall ring to be held in operative position with screws passed through said slots and secured in said tab-threaded holes whereby when said screws are loosely secured said outlet box can be held on said bracket in operative position for wiring operations within said outlet box and whereby when said screws are tightly secured the outer surface of said ring is maintained in substantially the same plane as the outer surface of said second and third plate portions.

8. In an electrical outlet box mounting assembly as claimed in claim 7 wherein said bracket is formed of sheet metal and includes inwardly turned stiffening edge portions surrounding selected said plate portions and said corner edges are outwardly curved.

9. In an electrical outlet box mounting assembly as claimed in claim 8 including at a second opposite end of said bracket a fifth rectangular plate portion contiguous with and perpendicular to said third plate portion.

10. In an outlet box mounting assembly as claimed in claim 9 including at a second opposite end of said bracket a fifth rectangular plate portion contiguous with and perpendicular to said third plate portion.

11. In an electrical outlet box mounting assembly as claimed in claim at 10 wherein at least one of said first and fifth plate portions is sufficiently long to substantially equal the width of the interior space of the wall on which said bracket is installed to thereby serve as a stiffening member for said bracket.

12. In an electrical outlet box mounting assembly as claimed in claim 7 including at a second opposite end of said bracket a fifth rectangular plate portion contiguous with and perpendicular to said third plate portion.

13. In an electrical outlet box mounting assembly as claimed in claim 12 wherein at least one of said first and fifth plate portions is sufficiently long to substantially equal the width of the interior space of the wall on which said bracket is installed to thereby serve as a stiffening member for said bracket.

14. In an electrical outlet box assembly as claimed in claim 12 wherein both said first and fifth plate portions are sufficiently long to substantially equal the width of the interior space of the wall on which said bracket is installed to thereby serve as stiffening members for said bracket.

15. In an electrical outlet mounting box assembly as claimed in claim 7 including second and third pairs of laterally-spaced screw slots matable with said tabs extending from selected third and fourth straight edges of said fourth plate portion opening whereby to provide a pair of screw slots extending from each said straight edge and of depth sufficient to permit at least limited box mounting adjustment both vertically and horizontally.

16. In an electrical outlet box mounting assembly as claimed in claim 15 wherein said bracket is formed of sheet metal and includes inwardly turned stiffening edge portions surrounding selected said plate portions and said corner edges are outwardly curved.

17. In an electrical outlet box mounting assembly as claimed in claim 15 including at a second opposite end of said bracket a fifth rectangular plate portion contiguous with and perpendicular to said third plate portion.

18. In an electrical outlet box mounting assembly as claimed in claim 15 wherein at least one of said first and fifth plate portions is sufficiently long to substantially equal the width of the interior space of the wall on which said bracket is installed to thereby serve as a stiffening member for said bracket.

19. In an electrical outlet box assembly as claimed in claim 15 wherein both said first and fifth plate portions are sufficiently long to substantially equal the width of the interior space of the wall on which said bracket is installed to thereby serve as stiffening members for said bracket.

* * * * *